(12) United States Patent
Thibadeau

(10) Patent No.: US 8,127,147 B2
(45) Date of Patent: Feb. 28, 2012

(54) METHOD AND APPARATUS FOR SECURING DATA STORAGE WHILE INSURING CONTROL BY LOGICAL ROLES

(75) Inventor: Robert Thibadeau, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1070 days.

(21) Appl. No.: 11/125,491

(22) Filed: May 10, 2005

(65) Prior Publication Data

US 2006/0259785 A1 Nov. 16, 2006

(51) Int. Cl.
*G06F 11/30* (2006.01)
*G06F 12/14* (2006.01)

(52) U.S. Cl. .................. 713/193; 726/1; 726/2; 726/29

(58) Field of Classification Search .................. 713/191, 713/193; 711/173; 726/1, 2, 27, 29
See application file for complete search history.

(56) References Cited

U.S. PATENT DOCUMENTS

| | | | |
|---|---|---|---|
| 5,150,465 A | 9/1992 | Bush et al. | |
| 5,375,243 A | 12/1994 | Parzych et al. | |
| 5,629,981 A * | 5/1997 | Nerlikar | 713/168 |
| 5,659,756 A * | 8/1997 | Hefferon et al. | 710/200 |
| 5,787,491 A * | 7/1998 | Merkin et al. | 711/173 |
| 5,892,899 A | 4/1999 | Aucsmith et al. | 395/186 |
| 5,949,882 A | 9/1999 | Angelo | |
| 6,092,189 A * | 7/2000 | Fisher et al. | 713/1 |
| 6,219,771 B1 | 4/2001 | Kikuchi et al. | 711/164 |
| 6,253,324 B1 * | 6/2001 | Field et al. | 713/187 |
| 6,360,945 B1 | 3/2002 | Drew | 235/382 |
| 6,468,160 B2 | 10/2002 | Eliott | |
| 6,691,198 B1 | 2/2004 | Hamlin | 710/305 |
| 6,735,693 B1 | 5/2004 | Hamlin | |
| 6,742,094 B2 | 5/2004 | Igari | |
| 6,823,398 B1 | 11/2004 | Lee et al. | |
| 7,003,674 B1 | 2/2006 | Hamlin | |
| 7,036,020 B2 | 4/2006 | Thibadeau | |
| 7,065,654 B1 * | 6/2006 | Gulick et al. | 713/193 |
| 7,178,015 B2 * | 2/2007 | Shaw et al. | 713/1 |
| 7,225,341 B2 * | 5/2007 | Yoshino et al. | 713/193 |
| 7,296,146 B2 * | 11/2007 | Shaw et al. | 713/153 |

(Continued)

FOREIGN PATENT DOCUMENTS

JP 2000155716 A 6/2000

(Continued)

OTHER PUBLICATIONS

First Office Action from corresponding foreign application 2006-131544, dated Mar. 19, 2010.

*Primary Examiner* — David García Cervetti

(74) *Attorney, Agent, or Firm* — Kirk A. Cesari; Cesari & Reed LLP

(57) ABSTRACT

A storage device with hardened security features has a storage medium, an interface, and a controller. The interface is adapted to communicatively couple the storage device to a host system. The controller is within the storage device and is adapted to read and to write information to and from the storage medium. The controller is adapted to require a security partition authorization from a manufacturer of the storage device before executing a security partition creation command received over the interface.

16 Claims, 8 Drawing Sheets

U.S. PATENT DOCUMENTS

| | | | |
|---|---|---|---|
| 7,356,678 B2 * | 4/2008 | Shaw et al. | 713/1 |
| 7,360,073 B1 * | 4/2008 | Billstrom et al. | 713/2 |
| 7,444,681 B2 * | 10/2008 | Shaw et al. | 726/27 |
| 7,809,873 B2 * | 10/2010 | Perry et al. | 710/110 |
| 7,913,030 B2 * | 3/2011 | Perry et al. | 711/5 |
| 2002/0077177 A1 | 6/2002 | Elliott | 463/40 |
| 2002/0157010 A1 * | 10/2002 | Dayan et al. | 713/191 |
| 2003/0023867 A1 * | 1/2003 | Thibadeau | 713/165 |
| 2003/0149854 A1 * | 8/2003 | Yoshino et al. | 711/173 |
| 2003/0188117 A1 * | 10/2003 | Yoshino et al. | 711/164 |
| 2004/0088513 A1 * | 5/2004 | Biessener et al. | 711/173 |
| 2004/0181303 A1 * | 9/2004 | Walmsley | 700/115 |
| 2005/0152331 A1 * | 7/2005 | Shaw et al. | 370/351 |
| 2005/0154869 A1 * | 7/2005 | Shaw et al. | 713/1 |
| 2005/0154881 A1 * | 7/2005 | Shaw et al. | 713/160 |
| 2005/0154901 A1 * | 7/2005 | Shaw et al. | 713/189 |
| 2005/0154910 A1 * | 7/2005 | Shaw et al. | 713/200 |
| 2005/0160281 A1 * | 7/2005 | Thibadeau | 713/189 |
| 2005/0198461 A1 * | 9/2005 | Shaw et al. | 711/173 |
| 2005/0198522 A1 * | 9/2005 | Shaw et al. | 713/200 |
| 2008/0066143 A1 * | 3/2008 | Charles Tai et al. | 726/1 |

FOREIGN PATENT DOCUMENTS

| | | |
|---|---|---|
| JP | 2002278838 A | 9/2002 |
| JP | 2004055031 A | 2/2004 |

* cited by examiner

| LOGICAL ROLE | METHOD OF CREATION |
|---|---|
| DEVICE MANUFACTURER | CREATED BY DEVICE MANUFACTURER BY INITIALIZING AN SP ACCESS CONTROL BASE CLASS STORED ON THE STORAGE MEDIA |
| DEVICE OWNER | CREATED BY KNOWLEDGE OF ACCESS CONTROL SECRET GRANTED BY THE DEVICE |
| APPLICATION OWNER | APPLICATION OWNER DESIGNATES THE LOGICAL ROLE DURING CREATION OF A SOFTWARE APPLICATION THAT UTILIZES THE SP |
| USER | THE USER OF AN APPLICATION CREATED DYNAMICALLY BY HIS OR HER USE OF THE APPLICATION |

FIG. 4

METHOD AND APPARATUS FOR SECURING DATA STORAGE WHILE INSURING CONTROL BY LOGICAL ROLES

CROSS-REFERENCE TO RELATED APPLICATION

None.

FIELD OF THE INVENTION

The present invention relates to storage subsystems offering hardened security features, and more particularly, to systems and techniques for controlling access to secure data areas of the storage subsystem.

BACKGROUND OF THE INVENTION

Disc drive and other storage subsystems, including flash memory devices and removable storage devices, typically have a processor (sometimes called a microprocessor) in their built-in electronics. The processor can be used to hide computations as well as stored data. In many security applications, and in many applications where an application provider may wish to guard against fraudulent use of applications or content, it may be desirable to perform certain computations in a hidden way. This includes hiding keys that may be employed to unlock an asset through a cryptographic proof or through simple knowledge of a shared secret. Performing computations in a hidden way may also include hiding certain computations that may be employed to allow software or content external to the storage device to operate desirably.

Generally, devices that offer storage subsystems with hardened security features employ various measures to protect data from unauthorized discovery. One such technique involves securing tabular data areas with various authentication methods.

One potential problem with any secured data area involves user access to that secured data area. More specifically, the user may or may not be granted access to that area. In some cases, access issues may lead to undesirable consequences, particularly when a confidential data area is secured by, for example, a malicious or otherwise unauthorized agent.

One purpose of versatile security data areas is to permit a third-party software vendor to acquire control over a hidden security partition (SP) on a disc drive or other storage subsystem. Once the vendor gains control, the vendor can set access controls on the data within that partition in any fashion. Unfortunately, the vendor may also deny the owner of the storage subsystem access to the data in the security partition. While it is common for third-party software vendors to deny owners access to data, in general, the owner always retains the option of deleting the associated software as well as explicitly installing the software. If an application is permitted to create a security partition without the permission of the device owner or a user of a device, a security partition may be created on the storage subsystem to which neither the user nor the device manufacturer has access. In other words, data may be hidden from the user, device owner or manufacturer which may be malicious but which remains inaccessible.

Therefore, there is a need in data storage for a system and method for controlling and managing security partition issuance and usage. Embodiments of the present invention provide solutions to these and other problems, and offer other advantages over the prior art.

SUMMARY OF THE INVENTION

A storage device with hardened security features has a storage medium, an interface, and a controller. The interface is adapted to communicatively couple the storage device to a host system. The controller is within the storage device and is adapted to read and to write information to and from the storage medium. The controller is adapted to require a security partition authorization from a manufacturer of the storage device before executing a security partition creation command received over the interface.

In one embodiment, a method for managing creation of security partitions on a storage medium of a storage device is provided. A security partition request is captured with a controller within the storage device. The security partition requests are received from a host system that is coupled to the storage medium by an interface connection. A secure link is established with an authorization server using the controller. The secure link provides a secure tunnel between the controller and an authorization server through which the controller requests a security partition authorization to create the requested security partition. The controller instantiates the security partition on the storage medium using the controller upon receipt of the security partition authorization.

In another embodiment, a storage device is coupled to a host system. The storage device has a storage medium, a read/write mechanism, and a controller. The read/write mechanism is coupled to the storage medium for reading and writing information to and from the storage medium. The controller is within the storage device and is coupled to the read/write mechanism. The controller is adapted to control reading and writing of information to the storage medium. The controller is adapted to capture requests for security partition creation received from the host system and to require a security partition authorization from an authorization server prior to creation of a respective security partition responsive to the captured requests.

Other features and benefits that characterize embodiments of the present invention will be apparent upon reading the following detailed description and review of the associated drawings.

BRIEF DESCRIPTION OF THE DRAWINGS

FIG. 4 is a simplified table of the logical roles and their associated methods of creation according to an embodiment of the present invention.

DETAILED DESCRIPTION OF ILLUSTRATIVE EMBODIMENTS

Figure 1:
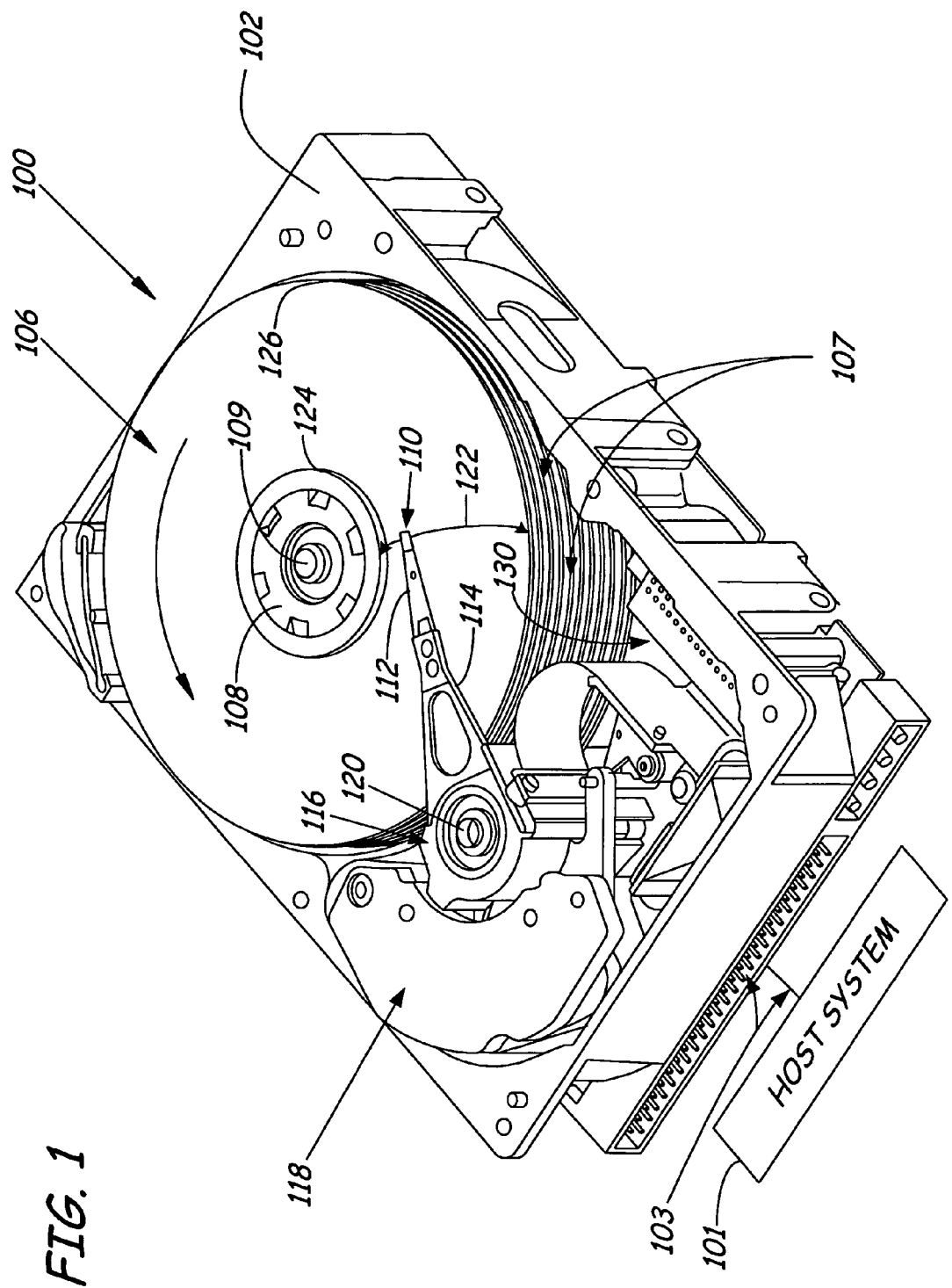
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads disposed on sliders 110 about a pivot shaft 120 to position heads on the sliders 110 over a desired data track along an arcuate path 122 between a disc inner diameter 124 and a disc outer diameter 126. Voice coil motor 118 is driven by servo electronics 130 based on signals generated by heads disposed on the sliders 110 and a host system 101 via interface 103. Today, the electronics 130 always includes at least one microprocessor, or controller, and firmware.

It should be understood by a worker skilled in the art that the present invention is intended for use with storage subsystems such as, for example, that shown in FIG. 1. Additionally, the present invention may be utilized with other storage devices and systems, such as flash memory drives, MRAM, EEPROM, or with any storage means on which secure areas may be created and maintained. As used herein, the term "secure" means that access to that element, location, sector or the like is restricted. Typically, secure data areas may be accessed only by authorized users or devices.

In general, the present invention identifies four logical components (or roles): a manufacturer of the storage device or an agent of the manufacturer ("manufacturer"); a device owner of the storage device, or its agent; a software application owner of the software that can acquire exclusive access to the security partition; and a user of the software application. These logical roles can be utilized by a controller within the storage system to control access to a security partition (SP) on the storage device. The term "security partition" refers to a logical area on the storage media to which access is tightly controlled. In some instances, the security partition may be hidden from the host operating system, meaning that the host operating system does not even know that the area of the storage media exists. The term "controller" refers to circuitry and/or software adapted to enforce restrictions with respect to data access permissions for accessing stored information on the storage medium. The controller may include firmware.

One potential problem that may arise with such security partitions involves creation of the security partition to which a device owner has no access. If such a security partition were created for malicious purposes or if its contents included a malicious script or program, the security partition could be used to harm other data on the drive. Therefore, it is desirable to provide a system and technique for managing the creation of security partitions on the storage device.

Though workers skilled in the art may consider a class of smart card known as a multi-application smart card to be a storage device as used herein, there is a fundamental difference between the implementation of the present invention and smart card implementations. In the case of a multi-application smart card the storage itself is not partitioned according to logical roles. Rather, the smart card allocates different software applications, running inside the smart card, to different software vendors.

In the present invention, the storage device grants different SPs to different software vendors on an exclusive basis. These SPs may share the same applications or they may not, but it is the storage device's exclusive grant of partitions of non-volatile memory that distinguishes the present invention.

The logical roles apply to the control over those exclusive partitions during different stages in the process of granting, managing, and disposing of them. The effect is to provide a storage device with many single-application smart cards instead of a single multi-application smart card. The control over logical roles is monolithic and independent for each of the individual single-application smart cards. For each SP there can be a different vendor or a different user, but the owner of the storage device and the manufacturer of the device have logical rights and obligations, too. The manufacturer ensures that a security partition is provided to only one vendor exclusively. The owner of the device must have the right to delete or suspend, but not necessarily inspect the contents, just as the user should have that right.

Figure 2:
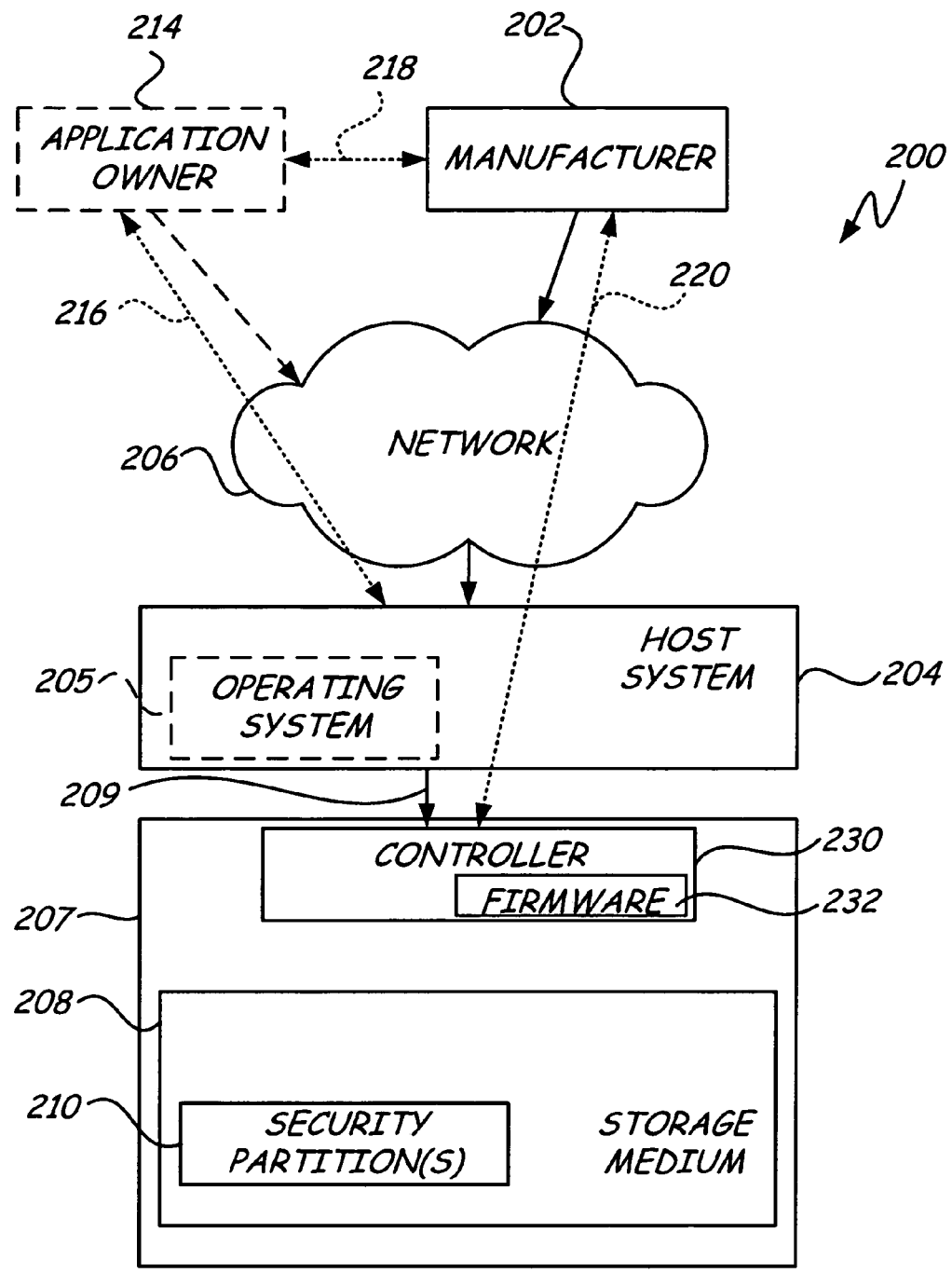
FIG. 2 is a simplified block diagram of a system for maintaining and controlling security partition issuance and access according to an embodiment of the present invention.

FIG. 2 illustrates an SP issuance management system 200 according to an embodiment of the present invention. A system 200 includes an authorizing server 202, and a host system 204, which is owned by the device owner. The authorizing server 202 may be a server managed by or licensed by the drive manufacturer, by an agent of the manufacturer, or by a licensee of the manufacturer. Preferably, the manufacturer of the storage drive maintains an active role in managing the authorizing server 202. Typically, the host system 204 has an operating system 205 and one or more software applications (created and owned by an application owner), which can be utilized by a user to process information.

The host system 204 is connected to the authorizing server 202 via network 206. The network 206 may be a local area network, a wide area network, a public switched network (such as, for example, a plain old telephone service or POTS), a digital network, a cellular network, or any type of communication medium capable of carrying electronic signals between the server and the client. More particularly, the network 206 is capable of hosting a communication link between the authorizing server 202 and the host system 204. The host system 204 generally is coupled to a storage device 207 via an interface 209. The storage device 207 includes a storage medium with a security partition 210, a controller 230 for controlling access to the storage medium 208 (and more particularly for controlling access to existing security partitions 210 and for prohibiting creation of new security partitions 210 without authorization from the manufacturer 202), and firmware 232 associated with the controller 230. The host system 204 may be a personal computer, a wireless phone with a memory, or any other device with a memory for which a security partition is desirable. The storage device 207 may be a random access memory (RAM), MRAM, EEPROM storage device, a flash memory drives, hard disc, floppy or removable disc, or any other type of storage device to which the host system 204 is connected via an interface 209. If the storage device 207 is internal to the host system 204, an interface 209, such as an ATA or SCSI interface, still couples the storage device 207 to the processor of the host system 204. The storage medium 208 may also include a stand-alone storage device accessible via network 206.

Generally, security partition 210 is a data area on the storage medium 208 to which access is restricted by the controller 230 and associated firmware 232. In one embodiment, the security partition 210 is a hidden data area on the storage medium 208. Specifically, the hidden security partition 210 is a data area of which the operating system of the host system 204 has no knowledge.

According to one embodiment of the present invention, the security partition 210 is created for use by a software application, and the software application may store user-inaccessible data in the security partition 210. As previously mentioned, a specific problem arises if an application owner maliciously or accidentally creates a security partition 210 without the permission of the owner or the user of the host system 204.

Consequently, the present invention is intended to control security partition creation on the storage device 207 via a secure network connection between the controller 230 of the storage device and the authorizing server 202. The host system 204 triggers a request for creation of a SP from the authorizing server 202 via the network 206. The authorizing server 202 authorizes the creation of the security partition 210 on the storage medium 208 of the host system 204, bypassing the host operating system 205 of the host system 204 by tunneling through to the controller 230 of the storage device 207 storage medium 208 directly. The controller 230 instantiates a security partition 210 on the storage medium 208 of the storage device 207 according to the authorization. In this manner, the manufacturer insures that the new security partition is properly authorized. This allows the manufacturer to control creation of security partitions 210 on the storage medium 208 of the storage device 207, by authorizing the creation of the security partition 210 by authorizing the controller 230 directly, without having to trust the operating system 205 of the host system 204.

In general, the term "tunneling" or "tunneled" refers to communications that are transported securely through the host. In one embodiment, a secure socket layer protocol is utilized to establish a connection between the authorizing server 202 and the host system 204, and then a second "light weight" protocol (such as IP security protocols or a custom security protocol) is used to further encrypt information passed within the secure socket layer link to allow for a direct, secure connection between the authorizing server 202 and the controller 230 of the storage device 207.

In one embodiment, a user of the host system 204 orders a software application for download from an application server 214. Typically, the order process involves a secure transaction, which may be executed over a secure socket layer (SSL) link or via a secure payment protocol connection over the network connecting the application server 214 to the host system 204. Since the requested application requires a security partition, the application server 214 establishes a secure link or tunnel 218 between the application server and the authorizing server 202 and requests creation of an SP on the host system 204.

If the application server 214 (or requesting application) is trusted, the authorizing server 202 establishes a tunnel 220 between the authorizing server 202 and the storage media 208 over network 206. In the present context, the term "trusted" may refer to "Trusted Drive" protocols for establishing a "Trust" relationship between two entities. Alternatively, the term "Trusted" may refer to a relationship established by contract or license agreement. The authorizing server 202 then authorizes creation of the SP on the storage media 208 by the controller 230 of the storage device 207, and the installation can proceed. Thus, the authorizing server 202 maintains strict control over creation of security partitions 210 on the storage media 208 of the host system 204. By maintaining this control, the system 200 guarantees that all security partitions 210 are created for trusted applications, and not for malicious programs. Moreover, the creation of the one or more security partitions 210 may include initialization of access controls, which establish access privileges to each security partition 210 for each the various roles (such as manufacturer, application owner, device owner, device user, and so on). The initialization of access privileges by the authorizing server 202 at creation of the security partition guarantees that certain roles will have some level of access to the created security partition 210. Specifically, the manufacturer and the device owner will have some level of access to the security partition 210, if for no other reason than to permit those roles the ability to remove the security partition 210 once created. Thus, the process of creating the security partition 210 includes generation or instantiation of the security partition 210 on the storage media 208 by the controller 230 and initialization of access controls related to the security partition 210. In one embodiment, initialization of the access controls includes populating an authority table or an access control list stored within the security partition wherein the authority table defines users (or devices) that can be permitted access to the security partition based on their logical roles. The authority table includes the access privileges (such as read/write, read only, delete, and the like) associated with each of the roles. Preferably, the controller 230 performs the process of initialization of the access controls for the security partition 210. Specifically, the controller 230 preferably instantiates access controls, including roles of those entities that can access the Security partitions 210.

Generally, the device owner of the host system 204 has permission to either delete or suspend services of the security partition 210. This device owner permission overrides any parallel permission granted the application owner, user or even the manufacturer. In this manner, if a device owner desires to remove a security partition 210 for any reason, the device owner may optionally suspend or remove it. If a device owner is also the user, then the user may optionally suspend or remove it. Similarly, the device owner may choose to have or not have the application and the corresponding security partition 210. In this case, the device owner may treat the security partition like any other software application and simply uninstall it.

In a preferred embodiment, the server 202 and the host system 204 are connected via network 206 when security provider issuance occurs. However, when a device owner decides to suspend or remove a security partition, the host system 204 need not be connected to server 202.

By managing security provider issuance via a server 202 over the network 206, the issuance (security partition issuance) process cannot occur without express manufacturer authorization, which establishes a level of assurance that the security partition 210 is not created and maintained maliciously. Moreover, by establishing secure communications between controller 230 and server 202 through the host 204, the server 202 can authorize such creation without having to trust the host 204.

Preferably, during manufacturing, the manufacturer of the storage device 207 configures or adapts the controller 230 to prohibit security partition creation absent an authorization from the authorizing server 202. A request for the creation of a security partition 210 on the storage device 207 may be received as a command from a host 204 over the interface 209. Alternatively, the request may be received over the interface 209 as an attempt to create a security partition 210 directly by the host 204 or by an application running in the operating system 205 of the host 204. The controller 230 is preferably adapted to intercept any attempted creation of a security partition 210, and to seek authorization by secure communication with the authorizing server 202 prior to proceeding with security partition creation. If the authorizing server 202 refuses the authorization request, the controller 230 terminates the security partition creation command, and rolls back any changes associated with the attempt.

Figure 3:
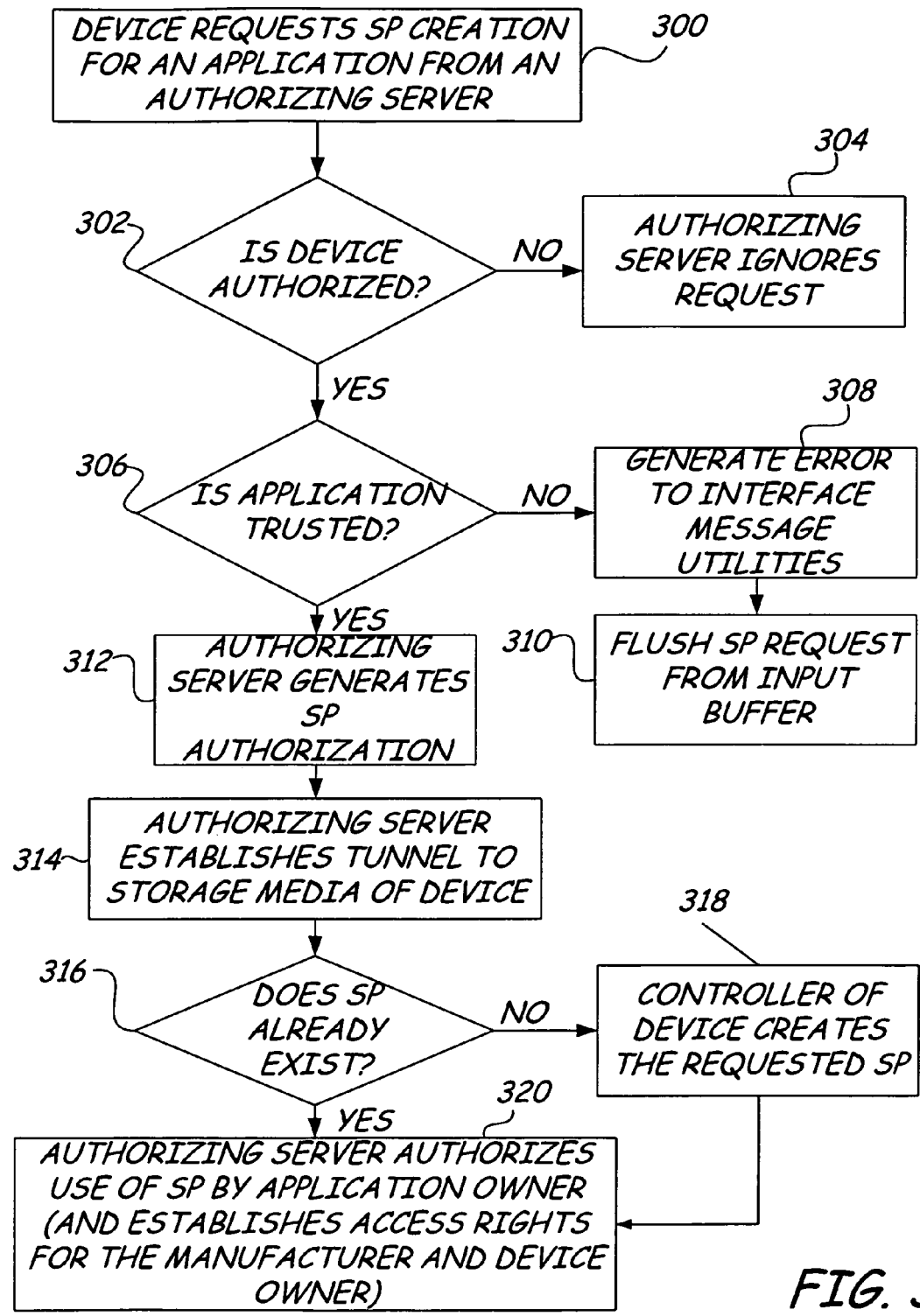
FIG. 3 is a simplified flow diagram of a method of controlling issuance of a security partition by an entity according to an embodiment of the present invention.

FIG. 3 illustrates a simplified flow diagram of a process of creating or authorizing a security partition based on a user request according to one possible embodiment of the present invention. It should be understood that for simplicity sake, a number of branches have been omitted. Additionally, it should be understood by workers skilled in the art that the order of the steps may vary significantly without compromising the security or the effectiveness of the technique. Consequently, FIG. 3 represents one possible flow, but is not the only possible ordering of steps.

A device requests creation of a security partition for an application from an authorizing server (step 300). The authorizing server determines whether the requesting device is authorized (step 302). If the device is not authorized, the security partition authorization request is ignored (step 304). If the device is authorized, the authorizing server determines whether the application is trusted (step 306). If application is not trusted, the authorizing server generates an error to the interface message utilities (step 308) and flushes the security partition request from its input buffer (step 310). If the application is trusted, the authorizing server generates a security partition creation authorization (for one or more security partitions) (step 312), and tunnels through the requesting device to its storage media to create the SP (step 314). The authorizing server determines if the security partition already exists (step 316). In other words, the authorizing server determines if the request is to authorize access to the security partition or to create a security partition. If the security partition does not already exist, the authorizing server creates the requested security partition (step 3318). If the SP already exists or if the authorizing server has already created the requested security partition, the authorizing server authorizes the use of the security partition by the application owner (and establishes access rights for the manufacturer and device owner) (step 320).

It should be understood by workers skilled in the art that use of a security partition generally refers to access to data stored in the security partition. Use may also refer to access to classes or other objects stored in the security partition. Both applications hosted by an operating system and security services operating below the level of the operating system may have access to security partitions on the storage media, and more than one security partition may exist on any given storage media. Not every software application makes use of a security partition. However, each application that utilizes a security partition would have its own unique security partition. Moreover, it should be understood that, though the discussion is largely directed to a discussion of a single security partition, the authorization request and the security partition creation may involve multiple security partitions, depending on the specific implementation.

In a preferred embodiment, the various logical agents may be created by a number of different means. FIG. 4 provides a simplified table of logical roles and their associated method of creation according to one possible implementation. The original device manufacturer creates the manufacturer role or an agent role associated with the "device manufacturer". The application owner creates the software application that uses the security partition and may also designate an agent having the logical role of "application owner". The user is the user of the application or the device that makes use of the software application, and the user role is created by his or her or its use of the software application. The "device owner" is a role that is created by the knowledge of an access control secret granted by the device. This secret may be a default secret provided by the manufacturer but changeable by the device owner (such as an initialization key provided on a sticker on the storage device, which is not discoverable by the storage device). This secret, and the authorization to remove or suspend a security partition that it provides, cannot be overridden by the application owner or the manufacturer.

As used herein, the term "secret" refers to an object or string of bits that are kept private and not revealed. In one embodiment, the secret is a password used to verify the authenticity of a host machine. In an alternative embodiment, the secret is a string that is known to the client and the server and used to validate and/or encrypt data transmitted between the client and the server. The secret may be an encryption key, or it may serve as a root key for unlocking an encryption/decryption key. In an alternative embodiment, a physical switch (such as a key, a USB dongle, a smart ID card or other physical device signifying physical access to the device) may replace or augment the unequivocal capability to remove or suspend a security partition.

Figure 5:
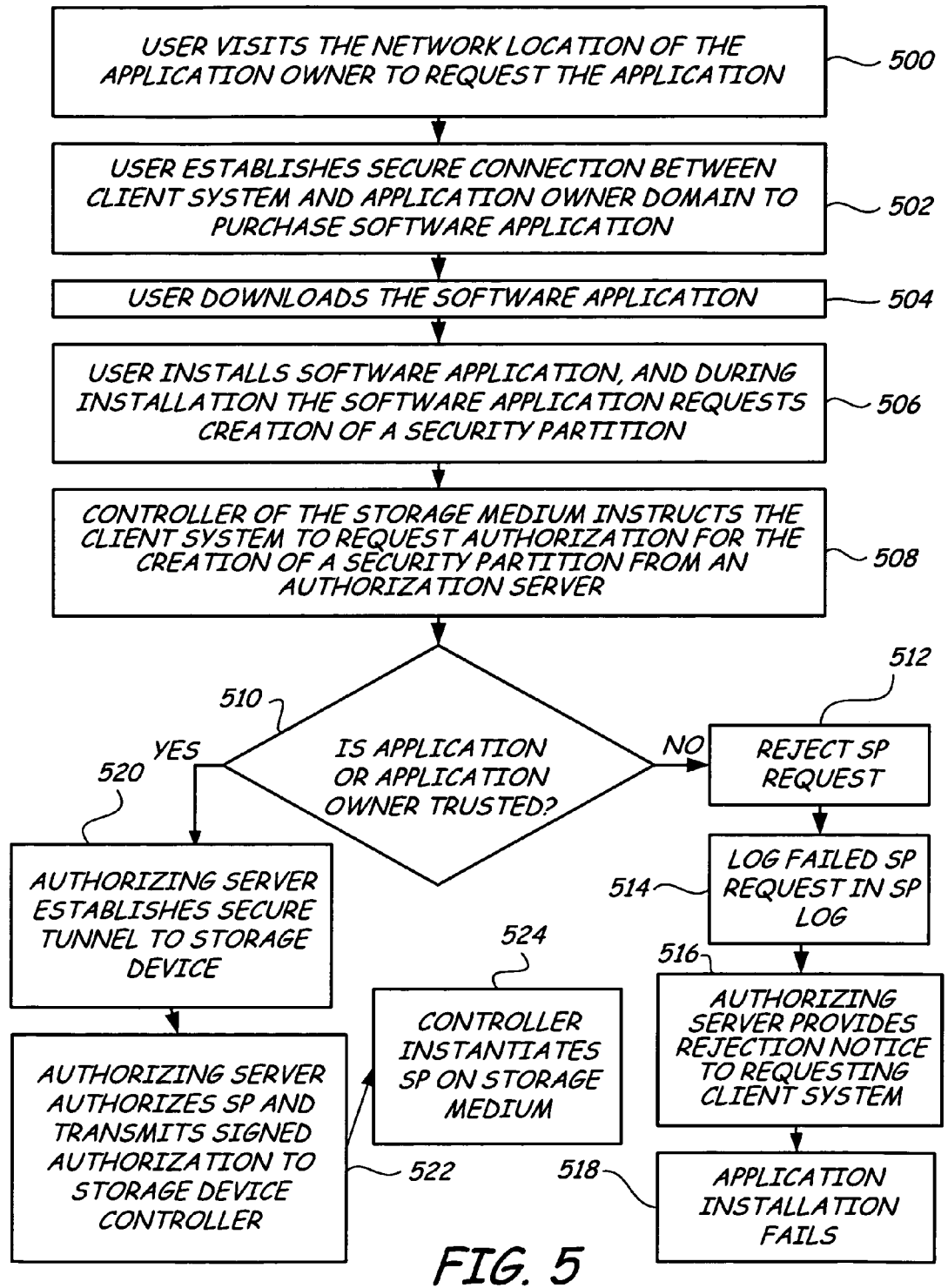
FIG. 5 is a simplified flow diagram of a method for creating an application specific to security partition according to an embodiment of the present invention.

FIG. 5 illustrates a simplified flow diagram of a process of issuing a security partition according to an embodiment of the present invention. Some elements have been omitted for simplicity. For example, failure to establish a secure tunnel or secure connection between the manufacturer and the application owner or the host system would likely result in failure (a possibility omitted from the flow diagram). Moreover, the flow diagram is simplified in that there are a number of variations to this process, which may be implemented without significantly affecting the general flow of the security partition issuance process.

A user visits a network location of an application owner to request a download of the application (step 500). The software application owner and the client system establish a secure connection for this download instance to purchase a software application (step 502). The user downloads the software application (step 504). The user installs the software application, during which installation process the installer attempts to create a security partition on the storage medium of the client system (step 506). The controller of the storage medium instructs the client system to request authorization for the creation of a security partition from an authorization server (step 508).

If the application or application owner is not trusted (step 510), the security partition creation request is rejected (step 512), and the failed security partition request is recorded in a security partition log (step 514). Additionally, a rejection notice is provided to the requesting client system (step 516), and the application installation fails (step 518). In general, it should be understood that the credentials and the security of the device must be sufficient that the security partition will not be issued unless proper authorization is received from the manufacturer. In a preferred embodiment, the controller of the storage media is adapted to intercept requests for security partition creation and to require authorization by the authorizing server prior to creation or instantiation of a security partition.

If the application or application owner is trusted, the authorizing server establishes a secure tunnel to the through the client system to the storage device (step 520). The authorizing server signs a specific authorization for the issuance of the requested security partition, and transmits the signed authorization to the controller of the client system (step 522), which creates the requested security partition on the storage media of the client system (step 524).

It should be understood that there are various alternative ways of achieving the secured, authenticated security partition issuance. In one embodiment, the manufacturer and the device make use of public key cryptography wherein the manufacturer can authenticate itself to a device, and the device can authenticate itself to the manufacturer. As long as the authentication process is interactive, then the mutual authentication can occur with an "nonced challenge" (a random value sent in a communications protocol exchange which is often used to detect replay attacks), insuring the presence of each party and insuring against replay and other man-in-the-middle attempts to issue a security partition without authorization). Additionally, there are many other well-known techniques by which authentication and secure authorization can be achieved.

In one embodiment, a master security partition is instantiated on the storage device by the device manufacturer, before the storage device is sold. The master security partition is instantiated with access permissions, and the device manufacturer's public keys are installed in the security partition to provide a means for the manufacturer server (or authorizing server) to gain authority over the storage media in order to create security partitions on the storage media. The controller can be adapted to prohibit creation of a security partition on the storage media without an authorized key, which can be verified against the pre-loaded keys in the hidden partition. A table of up to 64,384 public keys (pre-generated) may be used to populate a table of keys. Certain keys may be required for creation of a security partition, and use of such keys may cause them to be marked as "used" or "bad" within the security partition, so that they cannot be stolen and re-used. By using public keys only, even if the drive security is compromised, only public keys are discoverable.

Figure 6:
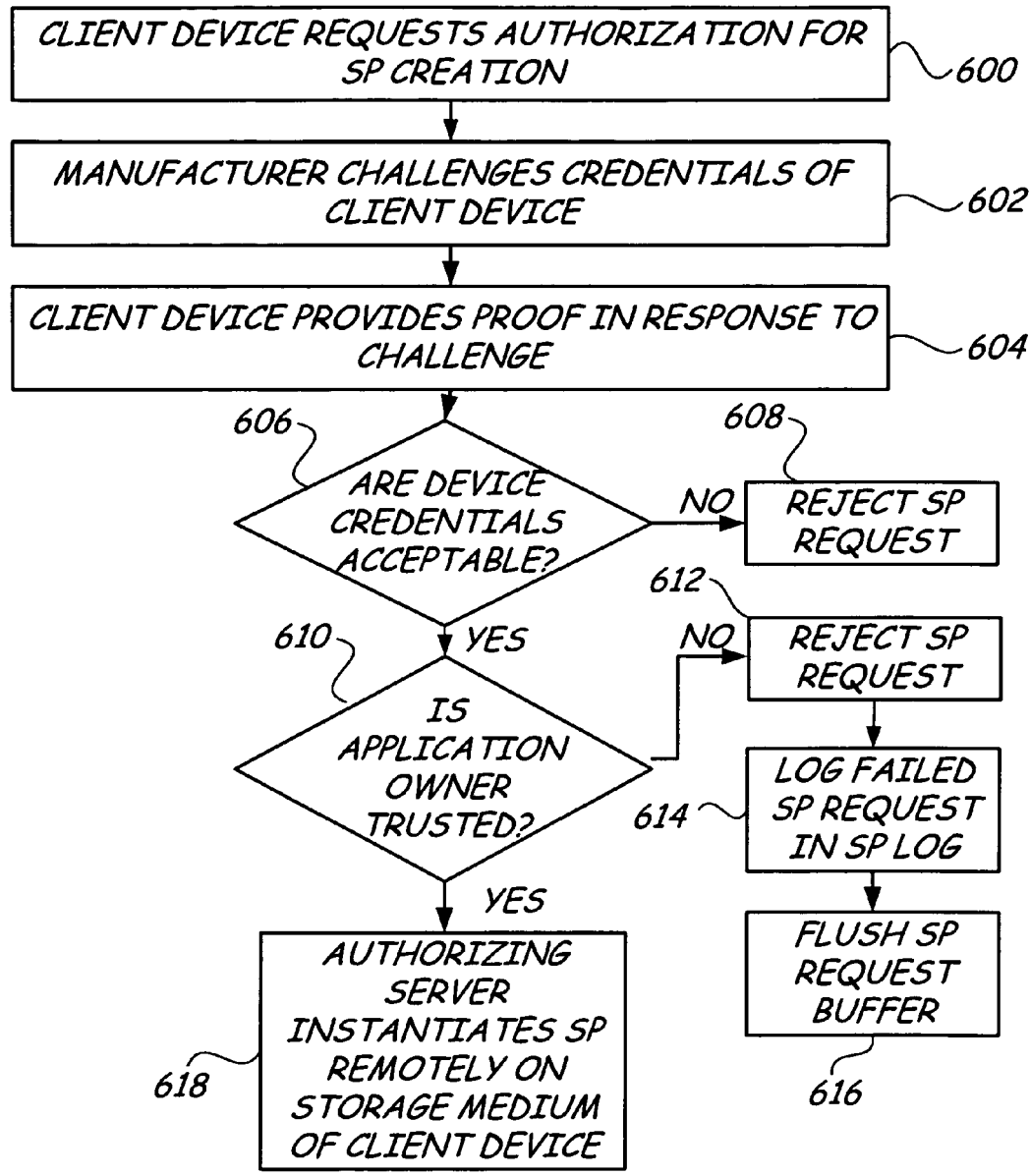
FIG. 6 is a simplified flow diagram of a portion of the application specific security partition creation process involving additional application steps according to another embodiment of the present invention.

FIG. 6 is a simplified flow diagram of a process of issuing authorization for the creation of a security partition. The client system requests authorization for security partition creation on the storage media (step 600). The authorizing server after establishing a secure link to the client system challenges the credentials of the client device (step 602). The client system provides proofs in response to the challenge (step 604). If the security partition credentials are not acceptable (step 606) the authorizing server rejects the security partition request (step 608).

The authorizing server determines whether the application for which the security partition is requested can be trusted (step 610). If the application is not trusted, the authorizing server rejectes the security partition request (step 612), logs the failed security partition request in a security partition log (step 614), and flushes the security partition request buffer (step 616). If the application is trusted, the authorizing server creates or instantiates the security partition directly (remotely over the network) on the storage medium of the client device (step 618).

Figure 7:
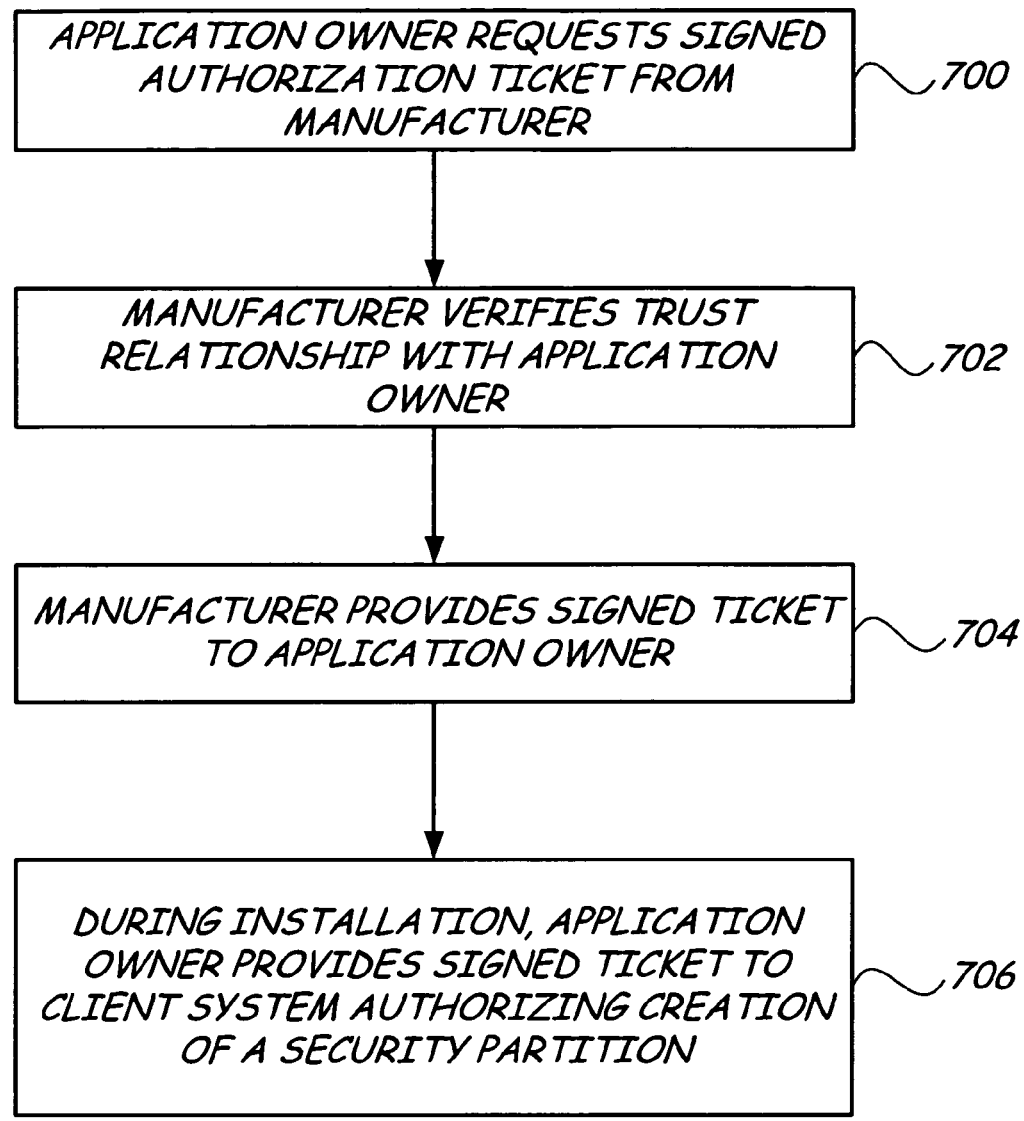
FIG. 7 is a simplified flow diagram of a method of providing an enterprise-wide ticket for mass installation of an application with a security partition.

FIG. 7 illustrates a simplified flow diagram of a process for issuance of an authorization to create a security partition for an enterprise-wide type installation. This type of authorization may be referred to as "serial issuance". For example, if a company were to purchase a software application from the application owner for enterprise-wide installation, it may be desirable for the application owner to retrieve a list of serial numbers (device ID numbers) from the company to provide to the manufacturer together with the application owner's credentials. The manufacturer could then issue a ticket authorizing installation of the security partition on the listed devices.

The application owner requests a signed authorization ticket from the manufacturer (step 700). The manufacturer verifies a trust relationship with the application owner (step 702). Typically, this verification process would involve decisions made by management of the manufacturer whether to trust the application owner with such authorization. If the application owner is trusted, the manufacturer provides a signed ticket to the application owner (step 704). During installation of the software application, the application owner provides the signed ticket to the client system authorizing creation of the security partition (step 706).

The requirement that issuance of a security partition occur online remains a requirement for serial issuance, or security partition by security partition issuance. A security partition by security partition issuance refers to a situation in which an application already granted a security partition requests creation of an additional security partition. In either instance, the manufacturer authorizes the issuance of a security partition. This guarantees that the manufacturer, and not the application owner, maintains control over security partition issuance.

In a preferred embodiment, a method for mass issuance involves presenting a ticket or credential that is sufficient to authorize security partition issuance. In manufacturing or through an online secure process, the devices are provided with a cryptographic secret, such as a public-private key pair or a symmetric key. The manufacturer or its agent must keep a record of this cryptographic secret and associate it with an identifier for the device. The manufacturer can now sign a specific authorization for the issuance of a security partition directed toward and interpretable by a specific device (or set of devices). Alternatively or additionally, the manufacturer may sign specific authorization for the issuance of a security partition that is not directed to a specific device that that would limit the number of issuances on a device using that ticket. In such an instance, the security partition issuance would be a ticket authorizing the creation of a security partition one time, using data embedded within the ticket to insure that the same ticket is not used twice in the same device. Thus, within an enterprise, that same ticket might be used one time for each device in the enterprise in order to perform a mass issuance without issuing multiple tickets.

To improve security further, the ticket may contain not only the specific authorization, but optionally the full programmatic setup of the SP for the application. This can be achieved if an application owner configures a ticket with the information needed to insure that the SP issuance will only be for the application, and the manufacturer then cryptographically signs or otherwise approves his approval of the ticket.

In certain circumstances, the specific authorization (sometimes referred to as ticket) may designate a range or list of devices, for example by serial number reference. The serial number reference may be signed by the manufacturer. In a preferred embodiment, much of the authentication process may be achieved using ISO x.509 certificates in public key cryptography. Additionally, various additional uses of public and private keys can anticipated for securely moving certificates and other data between the parties as may be required by the various logical agents in maintaining confidentiality and in authenticating the devices.

In general, it should be understood that within the security partition, access permission for the logical roles of manufacturer, application owner, device owner, and user can be maintained in an authority table. Moreover, access to the authority table may be restricted to the manufacturer and the application owner, for example. In general, the device owner is not given read/write access to the security partition; however, the device owner's authority trumps other authority levels in that the device owner may delete or uninstall the security partition.

In a preferred embodiment, each instantiation of a security partition on a storage device is authorized by an authorization server (such as the manufacturer). However, the authorization server may be any third-party server adapted to authenticate both the application owner and the client system. Typically, the authorization server is at trusted entity (an entity with which the client system has established a trust relationship). As used herein, the term "trusted" refers to a set of metrics or other proofs by which two machines can verify conditions that guarantee to a certain level that the two machines will behave as expected to a high probability. Once the trust relationship is established through secure communication links or tunnels and via interactive proofs, it is possible for the authorization server to establish the identity of the client system and to authorize creation of a security partition on the client system (or storage subsystem).

Figure 8:
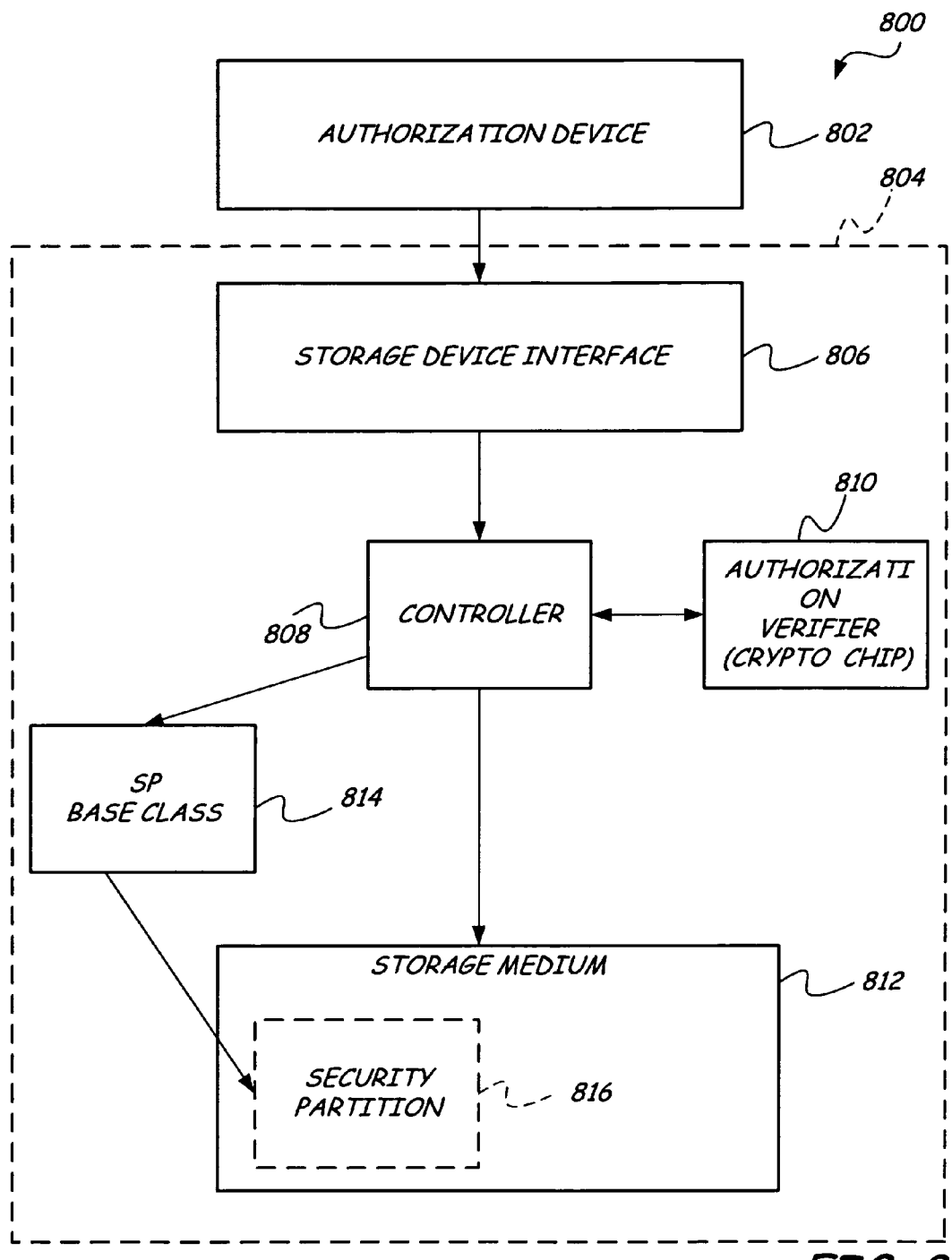
FIG. 8 is a simplified block diagram of a system configured according to an embodiment of the present invention.

FIG. 8 illustrates a simplified block diagram of system 800 for controlling creation of a security partition on storage medium of a storage device according to an embodiment of the present invention. The system 800 includes an authorization device 802 and a storage device 804, which are coupled by a communications link (which may be a network connection, a Universal Serial Bus connection, or any other communication link (including a modem connection). In a preferred embodiment, the link is a secure link, meaning that the information sent over (or via) the link is encrypted to prevent unauthorized access.

In general, the storage device 804 includes a storage device interface 806, a controller 808, an authorization verifier block (or cryptography chip) 810, a storage medium 812, and optionally a security partition base class 814 and a security partition 816. Generally, the storage device interface 806 is a circuit or transceiver block adapted to receive a security partition authorization sent from the authorization device. Security partition authorization refers to a ticket or certificate for a specific device or range of devices, which authorizes creation of a security partition on the storage device 804.

The controller 808 is generally configured to prohibit creation of a security partition on the storage medium 812 absent a security partition authorization certificate from the authorization device 802. Once received, the controller 808 authenticates the security partition authorization via an authorization verifier block (or cryptography chip) 810, which may be a software or hardware element. Assuming the security partition authorization is valid, the controller 808 creates the security partition 816 on the storage medium 812.

In one embodiment, during the manufacturing process, the manufacturer or authorization device creates a master security partition on the storage medium 812 of the storage device 804. The master security partition is a hidden area on the storage medium 812, which is inaccessible to the host operating system. In this embodiment, a security partition base class 814 may be stored in the master security partition, from which other security partitions may be instantiated. Access to the master security partition can be tightly controlled using an authority table contained with the security partition, so that only an authorized user can access the master security partition to instantiate new security partitions on the storage medium via the base class 814. Alternatively, the security partition authorization contains all information necessary to create the security partition on the storage medium, including a full programmatic set up of a software application which will utilize the security partition.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the security partition management system while maintaining substantially the same functionality without departing from the scope and spirit of the present invention. In addition, although the preferred embodiment described herein is directed to a system and method for managing issuance of security partitions on storage devices, it will be appreciated by those skilled in the art that the teachings of the present invention can be applied to any device with a memory on which a user has the authority to install software applications, without departing from the scope and spirit of the present invention.

What is claimed is:

1. A device comprising:
   a host computer system comprising
      a host processor;
      a data storage device comprising:
         a command interface configured to receive commands from the host computer system and a second computer communicatively coupled to the host computer system;
         a data storage medium;
         a data storage device controller coupled to the command interface and the data storage medium, the data storage device controller adapted to:
            create a security partition on the data storage medium when an authorization to create the security partition is received from the second computer along a direct secure connection that bypasses a host operating system while the host processor is executing the host operating system; and
            reject a request to create the security partition when the authorization is not received from the second computer.

2. The device of claim 1 wherein the data storage device further comprises a cryptography chip configured to authenticate the authorization, the cryptography chip coupled to the data storage device controller to indicate to the data storage device controller whether the authorization is authentic.

3. The device of claim 1 wherein the data storage device further comprises an existing security partition on the data storage medium and an authority table stored within the existing security partition, the authority table defining multiple permitted users that have privileges related to the existing security partition, wherein different users of the multiple permitted users may have different privileges related to the existing security partition.

4. The device of claim 1 wherein the security partition further comprises an area of the data storage medium that is hidden from the operating system.

5. The device of claim 1 wherein the data storage medium comprises multiple secure partitions, each of the multiple secure partitions for exclusive use by a specific authorized application.

6. The device of claim 1 wherein the data storage medium further comprises a master security partition having at least one security key, wherein the data storage device controller is configured to compare the at least one security key to a second security key received from the second computer to verify the second computer is allowed to issue the authorization to create the security partition on the data storage medium.

7. A device comprising a data storage controller configured to:
   receive a request to create a security partition on a data storage medium from a client system;

instruct the client system to request authorization to create the security partition from a second computer and connect to the second computer through a secure tunnel;

create the security partition when an authorization to create the security partition is received from the second computer through the secure tunnel; and reject the request to create the security partition when the authorization is not received from the second computer.

8. The device of claim 7 wherein the second computer comprises an authorization server communicatively coupled to the client system via a network.

9. The device of claim 8 wherein when the data storage controller creates the security partition the data storage controller initializes access controls to the security partition, the access controls including role-based access rights to the security partition.

10. The device of claim 9 wherein the authorization comprises a command authorizing the data storage controller to instantiate the security partition.

11. The data storage device of claim 7 further comprising a cryptography chip configured to indicate to the data storage controller whether the authorization is authentic by comparing a first security key stored in a secure area to a second security key received from the second computer.

12. The data storage device of claim 7 wherein the data storage medium comprises multiple secure partitions, each of the multiple secure partitions for exclusive use by a specific authorized application, and each of the multiple security partitions comprises an area of the data storage medium that is hidden from an operating system of the host computer.

13. A server comprising:

an interface to receive data and commands from a network;

a controller coupled to the interface and configured to:

receive an authorization request to create a security partition on an external data storage device that is external to the server, the authorization request identifying a specific application requesting creation of the security partition, wherein a security partition comprises an area of a data storage medium of the external data storage device that has a restricted access and is used exclusively by a specific authorized application;

determine whether an application requesting the authorization request is trusted;

determine whether to issue the authorization based on the comparison;

issue the authorization by sending an authorization indicator to the external data storage device when the requesting application is trusted; and reject the authorization by sending a rejection indicator to the external data storage device when the requesting application is not trusted.

14. The server of claim 13 further comprising the controller configured to determine if the requested security partition already exists and, when the requesting application is trusted, authorize use of the security partition for the specific authorized application when the security partition already exists.

15. The server of claim 13 further comprising the controller configured to establish a secure connection to send communications from the server, through the network and through a host computer of the data storage device, to the data storage device, to bypass an operating system of the host computer.

16. The server of claim 13 further comprising the controller configured to receive the authorization request from a second server communicatively coupled to the interface, wherein the external data storage device is part of a host system that is also external to the second server, and the authorization request from the second server comprises an authorization request to create a security partition on the external data storage device.

* * * * *